No. 716,180. Patented Dec. 16, 1902.
W. H. BREWSTER.
TRANSFORMING GEAR.
(Application filed June 13, 1901.)

(No Model.) 2 Sheets—Sheet 1.

Witnesses
Chas. A. Xardell
J. Benj. Brady.

Inventor
WILLIAM H. BREWSTER
By Milton E. Robinson
Attorney

No. 716,180.  
W. H. BREWSTER.  
TRANSFORMING GEAR.  
(Application filed June 13, 1901.)

(No Model.)

Patented Dec. 16, 1902.

2 Sheets—Sheet 2.

Witnesses  
Chas. A. Xardell  
J. Benj. Brady.

Inventor  
WILLIAM H. BREWSTER  
By Milton E. Robinson  
Attorney

UNITED STATES PATENT OFFICE.

WILLIAM H. BREWSTER, OF UTICA, NEW YORK, ASSIGNOR OF ONE-HALF TO JOSEPH F. COUPE, OF UTICA, NEW YORK.

TRANSFORMING-GEAR.

SPECIFICATION forming part of Letters Patent No. 716,180, dated December 16, 1902.

Application filed June 13, 1901. Serial No. 64,474. (No model.)

*To all whom it may concern:*

Be it known that I, WILLIAM H. BREWSTER, of Utica, in the county of Oneida and State of New York, have invented certain new and useful Improvements in Transforming-Gears; and I do hereby declare that the following is a full, clear, and exact description of the invention, which will enable others skilled in the art to which it appertains to make and use the same, reference being had to the accompanying drawings, and to the characters of reference marked thereon, which form part of this specification.

The object of my invention is to provide a transforming-gear which is simple and compact in its construction and capable of being easily and conveniently manipulated and particularly adapted for use in automobiles.

Figure 1:
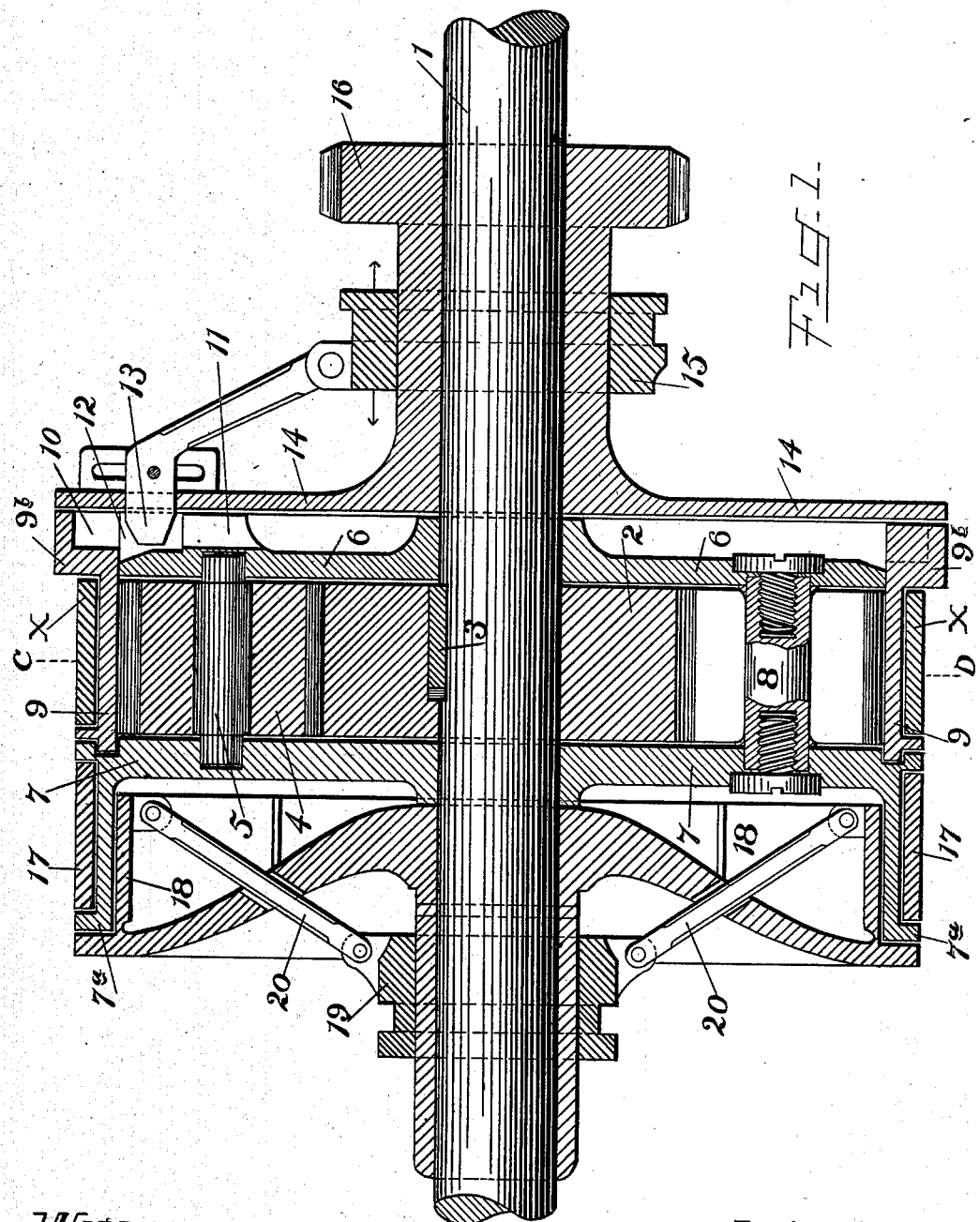
Figure 2:
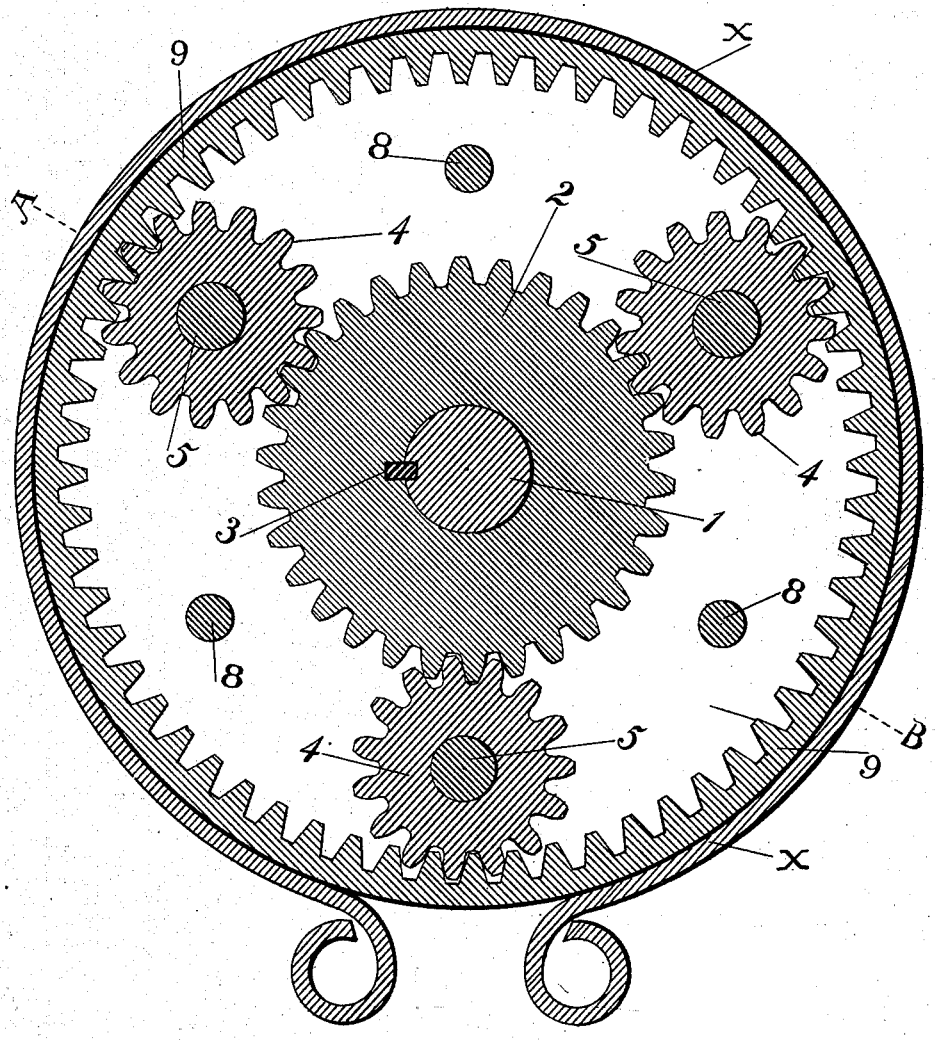

Figure 1 of the drawings shows a longitudinal section of the transformer taken on a line with A B of Fig. 2. Fig. 2 shows a cross-section taken on a line C D of Fig. 1.

Referring to the reference characters in a more particular description of the device, 1 indicates the shaft to which the power may be applied or from which after transforming it may be taken. I prefer to use it in the former manner. On the shaft 1 is secured a gear-pinion 2 by means, preferably, of a key 3. Arranged around the gear-pinion 2 are the planet-pinions 4, three in number, as shown in the drawings, although a greater or less number may be employed. The teeth of the pinions 4 mesh with the teeth of the pinion 2. The planet-pinion 4 is mounted on a bearing 5, which has its ends engaging in and supported by the plates or disks 6 and 7. The disks 6 7 are mounted on shaft 1 and are free to rotate on the shaft. The disks 6 7 are also coupled together by connecting columns or posts 8, three of which are shown in the drawings. Surrounding the planet-gears is a rotatable shell 9, provided with internal teeth 9ª, engaging with the teeth of the planet-gears. The shell 9 is also provided at one side with a flange projection 9ᵇ, which carries internal clutch-teeth 10. The exterior of the rotatable shell 9 is also provided with a groove opposite the planet-gears, which received a brake-band X. The disk or plate 6 is also provided with a series of clutch-teeth 11, and the teeth 10 and 11 are separated by an interval 12 sufficient to make provision for the passage of the clutch-dog 13. The clutch-dog 13 is supported on disk or plate 14, which is arranged to run freely on the shaft and covers or closes one side of the mechanism. The dog 13 is operated by the sliding collar 15, which is laterally movable on the sleeve portion of the disk or plate 14. The collar 15 is operated by any suitable lever or other mechanism. On the sleeve portion of the plate or disk 14 there is provided a sprocket-wheel 16, to which the power may be applied or from which it may be taken. It will be understood that there is preferably a series of dogs 13 provided in the construction.

The disk 7 is provided with a flange portion 7ª, provided with a groove on its outer surface, which receives the band-brake 17. The inner face of the flanged portion 7ª is adapted to be engaged by the friction-clutch 18, which clutch is mounted on and secured to the shaft 1 and is operated by the sliding collar 19 and arms 20. A lever or other suitable mechanism may be provided for moving the collar 19 to and fro to engage and disengage the clutch 18.

For the purpose of the description we will assume that the power is received on the shaft 1 and is to be transmitted to the sprocket 16. With the parts arranged in the position shown in Fig. 1 the power is entirely disconnected, for the reason that the position of the dog 13 is such that it will swing freely around the circle without engaging with either of the teeth 10 or 11. By operating the collar 15 in a proper direction to bring the dog 13 into engagement with the teeth 11 the plate 14 is connected to the disk 6, including also the disk 7 with the planet-gears, which planet-gears and disks may be termed the "planet" mechanism. The brake X then being applied to secure the shell 9 from movement the power is transmitted from the shaft 1 with movement in the same direction and decreased speed, and with the relative sizes of gears shown in the drawings the speed is decreased about one to three. Releasing the brake-band X and applying the clutch 18 makes a direct coupling between the sprocket 16 and the shaft 1, so that they both travel in the same direction and at the same speed. Operating the tooth-clutch 13 to engage the tooth with the tooth 10 of the shell 9 and applying the brake 17 to secure the planet mechanism against rotation around the shaft produces a reversed motion of the shaft.

The construction may be modified by providing a friction-clutch mechanism in lieu of the dog-clutch 13 with the teeth 10 and 11, such clutch operating to couple the disk 14 to either the casing 9 or the disk 6. I also contemplate modifying the form of clutch shown at 18, and a toothed clutch may be introduced at this point, if desired. Jars and shocks in starting or transforming the power from one speed to another or in the reversal are obviated by applying the brakes X and 17 gently. In case of the introduction of a friction-clutch instead of the dog-clutch 13 all shocks at this point may also be obviated by applying the clutch gently.

What I claim as new, and desire to secure by Letters Patent, is—

1. The combination in a transforming-gear of a shaft, an inclosed gear-pinion fixed on said shaft, planet-gears engaging therewith, disks loosely mounted on the shaft affording supports for the bearings of the planet-gears, a rotatable internally-toothed casing engaging with the planet-gears, a brake therefor, a rotary disk loosely mounted on the shaft and having clutch mechanism for engaging with said planetary mechanism or with said movable casing, a brake for said planetary mechanism and a clutch secured to the shaft and adapted to engage with said planetary mechanism, substantially as set forth.

2. The combination in a transforming-gear of a shaft passing through the transforming-gear, and on which the same is mounted, a gear-pinion fixed on said shaft, planet-gears and mountings therefor constituting the planet-gear mechanism, a brake for said planet-gear mechanism, a rotatable, internally-toothed ring-casing engaging with said planet-gears and supported by the planet-gear mechanism, a brake therefor and means for connecting power to, or receiving power from either said planet-gear mechanism or said casing, substantially as set forth.

3. The combination in a transforming-gear of a shaft passing through, and on which the gear is mounted and supported, a gear-pinion fixed on said shaft, planet-gears engaging therewith, disks loosely mounted on the shaft affording supports for the bearings of the planet-gears, a rotatable, internally-toothed ring-casing engaging with the planet-gears and supported by said disks, a brake for said casing, a brake for the planetary mechanism, and means for connecting power to, or receiving power through either said planetary mechanism or said casing, substantially as set forth.

4. The combination in a transforming-gear of a shaft, an inclosed gear-pinion fixed on said shaft, planet-gears engaging therewith, disks loosely mounted on the shaft and coupled together and affording a support for the bearings of the planet-gears, one of said disks having a flanged portion extending away from the plane of the planet-gears, a braking-surface arranged on the exterior and a clutch-surface arranged on the interior of said flanged portion, a brake for coöperating with said braking-surface and a clutch connected with the shaft for coöperating with said clutch-surface, a rotatable casing having internal teeth engaging with said planet-gears and having an external brake-engaging surface in the plane of the planet-gears, a brake therefor and means for connecting power to or receiving power from either said planet mechanism or said casing, substantially as set forth.

5. The combination of a driving part, a driven part, two drums, coacting gears carried respectively on the drums, a gear in connection with the driving part and meshed with one of the other gears, a clutch movable from one drum to the other to fasten either drum to the driven part and means for arresting the movement of either of said drums.

6. The combination of a driving part, a driven part, two rotary members, coacting gears carried respectively on said members, a gear in connection with the driving part and meshed with one of the other gears, a clutch movable from one rotary member to the other to connect either of said rotary members to the driven part and means for arresting the movement of either of said members.

In witness whereof I have affixed my signature, in presence of two witnesses, this 29th day of May, 1901.

WILLIAM H. BREWSTER.

Witnesses:
 JOS. F. COUPE,
 S. A. BROWN.